United States Patent [19]

Oates

[11] Patent Number: 4,746,716

[45] Date of Patent: * May 24, 1988

[54] COMPOSITIONS FOR PRODUCING POLYMERS OF HIGH REFRACTIVE INDEX AND LOW YELLOWNESS

[75] Inventor: Stephanie J. Oates, Wadsworth, Ohio

[73] Assignee: PPG Industries, Inc., Pittsburgh, Pa.

[*] Notice: The portion of the term of this patent subsequent to Nov. 11, 2003 has been disclaimed.

[21] Appl. No.: 937,257

[22] Filed: Dec. 3, 1986

Related U.S. Application Data

[63] Continuation of Ser. No. 814,344, Dec. 27, 1985, abandoned.

[51] Int. Cl.$^4$ ............................................... C08F 18/24
[52] U.S. Cl. ................................ 526/314; 558/268; 558/270; 558/271
[58] Field of Search ...................... 558/268, 270, 271; 526/314

[56] References Cited

U.S. PATENT DOCUMENTS

| | | | |
|---|---|---|---|
| 2,370,567 | 2/1945 | Muskat et al. | 260/463 |
| 2,455,652 | 12/1948 | Bralley et al. | 260/77.5 |
| 2,455,653 | 12/1948 | Bralley et al. | 260/77.5 |
| 2,587,437 | 2/1952 | Bralley et al. | 260/77.5 |
| 3,148,172 | 9/1964 | Fox | 558/271 |
| 3,340,229 | 9/1967 | Bostian et al. | 260/47 |
| 3,912,687 | 10/1975 | Haupt et al. | 558/268 |
| 4,495,345 | 1/1985 | Kawakami et al. | 528/372 |
| 4,542,201 | 9/1985 | Kanemura et al. | 526/314 |
| 4,622,376 | 11/1986 | Misura et al. | 526/286 |
| 4,666,976 | 5/1987 | Misura | 524/739 |

*Primary Examiner*—Joseph L. Schofer
*Assistant Examiner*—Peter D. Mulcahy
*Attorney, Agent, or Firm*—George D. Morris

[57] ABSTRACT

(Allylic carbonate)-functional compounds containing three phenylene groups are useful for forming polymers.

18 Claims, No Drawings

COMPOSITIONS FOR PRODUCING POLYMERS OF HIGH REFRACTIVE INDEX AND LOW YELLOWNESS

This is a continuation of application Ser. No. 814,344, filed Dec. 27, 1985, now abandoned.

BACKGROUND OF THE INVENTION

Aliphatic polyol poly(allyl carbonate) monomer, most notably diethylene glycol bis(allyl carbonate), has for many years been used in producing ophthalmic lenses. Such lenses exhibit low yellowness when undyed, substantial hardness, and refractive indices that are sufficient for many, if not most, ophthalmic applications. There is a need, however, for polymeric lenses of higher refractive indices than those ordinarily provided by polymers of aliphatic polyol poly(allyl carbonate).

This need centers around the desire to reduce the volume of material required to produce a lens of given size, minimum thickness, and optical correction, which volumetric reduction can be achieved through use of polymeric materials having higher refractive indices.

The present invention is directed to compounds which may be free radically polymerized to produce polymerizates having high refractive index. The polymerizate may be a prepolymer which is later further polymerized to produce a thermoset polymerizate having acceptable hardness or it may be the thermoset polymerizate itself.

Accordingly, one embodiment of the invention is a compound represented by the formula

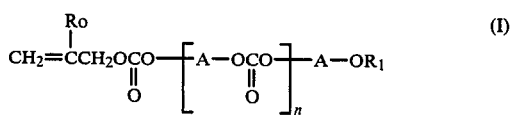

wherein (a) $R_1$ is

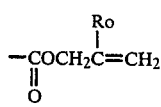

or hydrogen; (b) each Ro of the compound is independently hydrogen, halo, or alkyl; (c) each A of the compound is independently represented by the formula

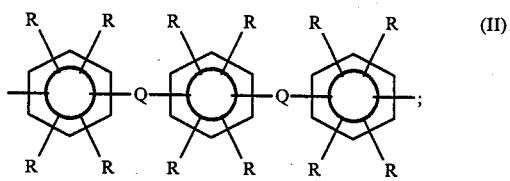

(d) each R of the compound is independently hydrogen, halo, or a monovalent organo group containing from 1 to about 12 carbon atoms; (e) each Q of the compound is independently oxy, sulfonyl, alkanediyl, or alkylidene; and (f) the value of n is an integer in the range of from 0 to about 4.

Preferably, $R_1$ is

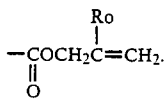

In most cases each Ro of the compound is independently hydrogen, halo, or alkyl containing from 1 to about 4 carbon atoms. The alkyl group is usually methyl or ethyl. Examples of Ro include hydrogen, chloro, bromo, fluoro, methyl, ethyl, n-propyl, isopropyl and n-butyl. Most commonly Ro is hydrogen or methyl; hydrogen is preferred.

The monovalent organo group often used for R can vary widely. Illustrative of the various classes from which the monovalent organo group is usually chosen are alkyl (including unbranched alkyl and branched alkyl), cycloalkyl, alkoxy, alkylthio, homocyclic aromatic groups such as phenyl and naphthyl, heterocyclic aromatic groups and aralkyl. The monovalent organo group may be selected from other classes as required. In most cases the monovalent organo group is alkyl containing from 1 to about 4 carbon atoms or phenyl.

Of the halo groups used for R, chloro and bromo are preferred.

When Q is alkanediyl, it contains at least 2 carbon atoms and may be branched or unbranched. In most cases the alkanediyl contains from 2 to about 4 carbon atoms. Examples of suitable alkanediyl groups include 1,2-ethanediyl, 1,3-propanediyl, 1-methyl-1,2-ethanediyl, 1,4-butanediyl, 1-methyl-1,3-propanediyl, 2-methyl-1,3-propanediyl, 1-ethyl-1,2-ethanediyl, and 1,2-dimethyl-1,2-ethanediyl. 1,2-Ethanediyl is preferred.

When Q is alkylidene, it contains at least one carbon atoms and may be branched or unbranched. In many cases the alkylidene contains from 1 to about 5 carbon atoms. Examples of suitable alkylidene groups include methylene, ethylidene, propylidene, 1-methylethylidene (viz., isopropylidene), butylidene., 1-methylpropylidene, 2-methylpropylidene, and 2-ethylpropylidene. 1-Methylethylidene is preferred.

In most cases the value of n is 0 or 1. The preferably value of n is zero.

A subclass of the divalent group A which is of particular importance is represented by the formula

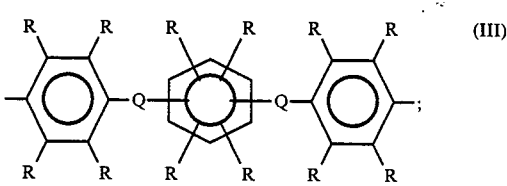

where R and Q are as discussed in respect of Formula II. Within this subclass it is preferred that A be represented by the formula

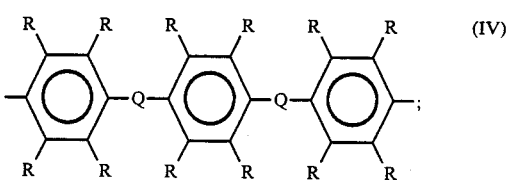

or by the formula

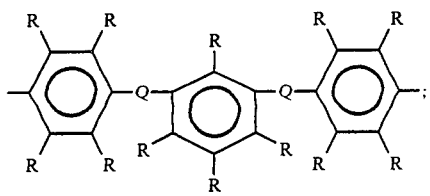

Another embodiment of the invention is a mixture of polymerizable compounds, which mixture comprises at least one compound represented by Formula I. Usually the mixture comprises a plurality of compounds represented by Formula I.

The compounds of the invention may be prepared by several methods. In one method, the appropriate allyl alcohol is reacted with phosgene to form the corresponding allyl chloroformate which is then reacted with the desired dihydroxy aromatic-containing compound represented by the formula

HO—A—OH   (VI)

where A is as discussed in respect of Formula I. In another method, the dihydroxy aromatic-containing compound represented by Formula VI is reacted with phosgene to form chloroformate-functional compound represented the formula ClCO—A—OR$_2$,   (VII)
∥
O where A is as discussed in respect of Formula I and R$_2$ is hydrogen or chlorocarbonyl. The compound of Formula VII is then reacted with the appropriate allyl alcohol. In a third method, the dihydroxy aromatic-containing compound, the appropriate allyl alcohol, and phosgene are mixed together and reacted. In all of these reactions the proportions of reactants are approximately stoichiometric, although when bis(allyl carbonate) is being prepared, the phosgene may be used in substantial exces if desired. The temperatures of the chloroformate-forming reactions are preferably below about 100° C. in order to minimize the formation of undesirable by-products. Ordinarily the temperature of the chlorformate-forming reaction is in the range of from about 0° C. to about 20° C. The carbonate-forming reaction is usually conducted at about the same temperatures, although higher temperatures may be employed. Suitable acid acceptors, e.g., pyridine, a tertiary amine, an alkali metal hydroxide, or an alkaline earth metal hydroxide may be employed when desired. The reactions are usually liquid phase reactions. Preferably they are conducted in the absence of extrinsic solvent, although extrinsic solvent may be used when desirable or when necessary to solubilize one or more of the reactants. Examples of suitable extrinsic solvents that may be used include benzene, toluene, xylene, chlorobenzene, o-dichlorobenzene, o-chlorotoluene, acetone, methylene chloride, chloroform, perchloroethylene, trichloroethylene, and carbon tetrachloride. The pressures at which the reactions are conducted may vary widely, but usually they are at about ambient pressure or a little higher depending upon the pressure drop through the equipment.

The procedures by which the compounds of the invention are prepared are similar to those known for the preparation of other (allyl carbonate)-functional compounds. See for example, U.S. Pat. Nos. 2,370,567; 2,455,652; 2,455,653; and 2,587,437, the disclosures of which are, in their entireties, incorporated herein by reference.

Because of the processes by which the compounds of the invention are prepared, the final reaction product can and usually does contain a mixture of a plurality of compounds represented by Formula I. The distribution of individual species is governed primarily by the stoichiometry and temperatures employed. In most cases minor amounts of related species are also present. Individual species of the principal class of related species can be represented by the formula

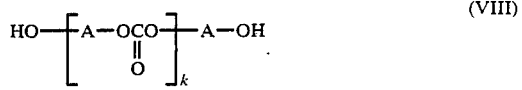

wherein each A is independently as discussed with respect to Formula I and the value of k is an integer in the range of from 0 to about 4. Typically the value of k is 0 or 1. In most cases the value k is zero.

The reaction mixture may be purified so as to contain essentially no related species, but this is rarely done. Although the reaction mixture may contain only a single related species, it usually contains a mixture of different related species. Typically all of the related species taken together constitute from about 0.5 to about 3 weight percent of the reaction mixture on an extrinsic solvent-free basis.

Similarly, one compound of the invention or a group of such compounds may be isolated from the reaction mixture, but this also is rarely done.

The dihydroxy aromatic-containing compounds of Formula VI are themselves well known or may be prepared by procedures known to the art. Examples of such compounds include 4,4'-[1,4-phenylenebis(methylene)]bisphenol, 4,4'-[1,4-phenylenebis(1-methylethylidene]bisphenol, 4,4'-[1,4-phenylenebis-(1-methylethylidene)]bis[2-chlorophenol], 4,4'-[1,3 bis(1-methylethylidene)]bisphenol, 2,2'-[1,3-phenylenebis(1-methylethylidene)]bis[6-(1,1-dimethylethyl)-4-methylphenol], 4,4'-phenylenebis( 2,1-ethanediyl)]bisphenol, 4,4'-[1,4-phenylenebis(oxy)]bisphenol, 3,3'-[1,4-phenylenebis(oxy)]bisphenol, 2,2'-[1,2-phenylenebis(oxy)]bisphenol, 4,4'-[[2,5-bis(1,1-dimethylethyl)-1,4-phenylene]bis(oxy)]- bis[2,6-bis(1,1-dimethylethyl)phenol], 4-[(4-hydroxy-3,5-dimethylphenoxy dimethylphenoxy]- dimethylphenol halo substituted 4,4'-1,4-phenylenebis-(oxy)]bisphenol, 4,4'-[1,4-phenylenebis(thio), bisphenol, 4,4'-[1,4-phenylenebis(sulfonyl)]bisphenol.

Usually one or more compounds of the invention are employed as constituents of a polymerizable composition. In most cases the polymerizable composition is pourable. Such pourable, polymerizable compositions are especially useful for casting lenses, lens blanks, and other shapes by pouring the composition into suitable molds and then polymerizing the composition to form a solid, thermoset polymer of the desired shape.

Other materials may optionally be present in the polymerizable composition. In most cases, the compound or compounds of the invention are present in the polymerizable composition in an amount in the range of from about 2 to 100 percent by weight. Often the compound or compounds of the invention are present in an amount in the range of from about 70 to about 100 percent by weight. From about 85 to about 98 percent is preferred.

Optional materials which may be present in the polymerizable composition includes other ethylenically unsaturated compounds, as for example, acrylates, methacrylates, ethacrylates, haloacrylates, vinylfunctional compounds, other allylic-functional compounds, other alkyl or halo substituted allylic-functional compounds, and/or esters of ethylenically unsaturated dicarboxylic acids. When the other ethylenically unsaturated compounds are present, they usually constitute from about 1 to about 90 percent by weight of the polymerizable composition. In many cases they constitute from about 3 to about 30 percent by weight of the polymerizable composition. From about 5 to about 10 percent is preferred.

When, as is preferred, polymerization of the polymerizable composition is initiated by thermally generated free radicals, the polymerizable composition contains initiator. The thermal initiators which may be used in the present invention may be widely varied, but in general they are thermally decomposable to produce radical pairs. One or both members of the radical pair are available to initiate addition polymerization of ethylenically unsaturated groups in the well-known manner.

The preferred thermal initiators are peroxy initiators. There are many different peroxy initiators which can be used. Examples of such peroxy initiators include: peroxydicarbonate esters such as di-n-propyl peroxydicarbonate, diisopropyl peroxydicarbonate, di-n-butyl peroxydicarbonate, di-sec-butyl peroxydicarbonate, diisobutyl peroxydicarbonate, di(2-ethylhexyl) peroxydicarbonate, diacetyl peroxydicarbonate, dicyclohexyl peroxydicarbonate, di(4-tert-butylcyclohexyl) peroxydicarbonate, and isopropyl sec-butyl peroxydicarbonate; monoperoxycarbonates such as tertiary-butylperoxy isopropyl carbonate and tertiary-amylperoxy isopropyl carbonate; diacetyl peroxides such as diacetyl peroxide, dibenzoyl peroxide, dilauroyl peroxide, and diisobutyryl peroxide; and peroxyesters such as tertiary-butyl perpivalate, tertiary-butyl peroctoate and tertiary-butyl perneodecanoate.

Only one initiator or a plurality of initiators may be used as desired.

When used, the amount of initiator present in the polymerizable composition may be widely varied. Ordinarily the weight ratio of the initiator to all ethylenically unsaturated material present in the composition is in the range of from about 0.5:100 to about 7:100. In many cases the weight ratio is in the range of from about 1:100 to about 5:100. A weight ratio in the range of from about 2:100 to about 4:100 is preferred.

It will be recognized by those skilled in the art that the most preferred weight ratios of initiator will depend upon the nature of the initiator used (its active oxygen content) as well as the nature and ratios of the variously ethylenically unsaturated materials present in the composition.

Other materials which may optionally be present in the polymerizable composition include mold release agents and dyes.

The listing of optional ingredients discussed above is by no means exhaustive. These and other ingredients may be employed in their customary amounts for their customary purposes so long as they do not preclude the formation of solid, crosslinked polymer.

In the polymerizable composition, the ethylenically unsaturated materials should be in the form of a solution in the proportions used. Insoluble optional materials, such as for example pigments, while not preferred, may also be present.

The polymerizable compositions of the invention are usually prepared by admixing the various ingredients. Mixing may be accompanied with heating when it is desirable to hasten dissolution of any of the ingredients. However, if initiator is present during heating, the temperature should ordinarily be maintained below that at which polymerization is initiated. It is preferred to employ heating in the absence of initiator, to cool the resulting solution, and then to introduce the initiator and other ingredients which enter the solution without undue difficulty.

The compounds of the invention can be free-radically polymerized by known conventional techniques for polymerizing (allyl carbonate)containing compositions to form solid, crosslinked polymer, or to form liquid, pourable prepolymer which may subsequently be polymerized to form solid, thermoset polymer. A single compound of the invention may be polymerized or a mixture of polymerizable compounds, which mixture comprises at least one of the compounds of the invention, may be polymerized.

The preferred polymer of the invention (whether prepolymer or solid, thermoset polymer) comprises units represented by the formula

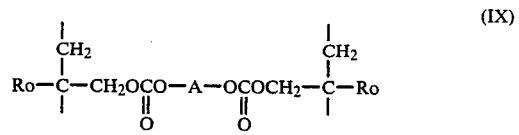

(IX)

where each Ro and A are as described in respect of Formula I. In many cases, A is represented by Formula III, of which the subgenera represented by Formula IV and/or Formula V are preferred.

Preferably, polymerization is accomplished by heating the polymerizable composition to elevated temperatures in the presence of free-radical initiator. Typically polymerization is conducted at temperatures in the range of from about 28° C. to about 100° C. In many cares post curing, that is, heating beyond the time thought necessary to substantially fully polymerize the composition is employed. The post cure is often carried out above about 100° C., but below the temperatures at which thermal degradation provides undesirable yellowness, e.g., about 125° C., and preferably for a time sufficient to attain either substantially constant or maximum Barcol hardness. For example, when the cure cycle shown in Table 2 below is followed, the polymerizate may be maintained at 100° for an additional 1 to 4 hours or more. Although not wishing to be bound by any theory, the additional 1 to 4 hours of post cure is believed to decompose, primarily by initiation and chain termination, from 83 percent to 99.9 percent of the peroxide initiator remaining unreacted at the end of the normal 18 hour cure cycle. Moreover, the additional 1 to 4 hours of cure often increases the Barcol Hardness by about 5 to 8 units.

In most cases, the polymerizable, composition is conformed to the shape of the final solid polymerized article before polymerization. For example, the composition can be poured onto a flat surface and heated, whereby to effect polymerization and form a flat sheet or coating. According to a still further exemplification, the polymerizable composition is placed in molds, as for instance glass molds, and the molds heated to effect polymerization, thereby forming shaped articles such as lens blanks or ophthalmic lenses. In one particularly preferred embodiment, the composition is poured into a lens mold and polymerized therein to produce an ophthalmic lens. In another particularly preferred embodiment, the composition is poured into a lens blank mold and polymerized therein to produce a lens blank.

A wide variety of cure cycles, that is, time-temperature sequences, may be used during polymerization. Ordinarily the cure cycle employed is based upon a consideration of several factors including the size of the coating, the identity of the initiator, and the reactivity of the ethylenically unsaturated material. For casting ophthalmic lenses or lens blanks, several standard cure cycles have been developed and these are shown in Tables 1–4. These standard cure cycles are useful in forming polymerizates according to the present invention, but they are, however, only exemplary, and others may be used.

TABLE 1

Standard Cure Cycle for Diisopropyl Peroxydicarbonate

| Cumulative Hours | Oven Temperature, °C. |
|---|---|
| 0 | 44 |
| 2 | 46 |
| 4 | 48 |
| 6 | 50 |
| 8 | 54 |
| 10 | 58 |
| 12 | 64 |
| 14 | 69 |
| 16 | 85 |
| 17 | 105 (End of Cycle.) |

TABLE 2

Standard Eighteen Hour Cure Cycle for Benzoyl Peroxide

| Cumulative Hours | Oven Temperature, °C. |
|---|---|
| 0 | 63 |
| 2 | 63 |
| 4 | 65 |
| 6 | 67 |
| 8 | 77 |
| 10 | 80 |
| 12 | 85 |
| 14 | 88 |
| 16 | 92 |
| 18 | 100 (End of Cycle.) |

TABLE 3

Standard Five Hour Cure Cycle for Benzoyl Peroxide

| Cumulative Hours | Oven Temperature, °C. |
|---|---|
| 0 | 90 |
| 1 | 90 |
| 2 | 90 |
| 3 | 90 |
| 3.5 | 96 |
| 4 | 103 |
| 4.5 | 109 |
| 5 | 115 (End of Cycle.) |

TABLE 4

Standard Cure Cycle for Tertiary-Butylperoxy Isopropyl Carbonate

| Cumulative Hours | Oven Temperature, °C. |
|---|---|
| 0 | 90 |
| 2 | 91 |
| 4 | 92 |
| 6 | 93 |
| 8 | 95 |
| 10 | 97 |
| 12 | 100 |
| 14 | 103 |
| 16 | 110 |
| 17 | 120 (End of Cycle.) |

The present solid, thermoset polymers of the invention usually have 15-second Barcol hardnesses of at least zero. In many cases the Barcol hardness is at least about 15, and preferably it is at least about 25. As used herein, 15-second Barcol hardness is determined in accordance with ASTM Test Method D 2583-81 using a Barcol Impressor and taking scale readings 15 seconds after the impressor point has penetrated the specimen.

The present solid, thermoset polymers on an undyed and untinted basis, often also have yellowness indices at a sample thickness of about 2.5 millimeters of about 4 or lower. Often the yellowness index is about 2.5 or lower. Preferably, the yellowness index is about 1.5 or lower. As used herein, yellowness index is determined on specimens having a thickness of about 2.5 millimeters in accordance with ASTM Test Method D 1925-70 (Reapproved 1977) using a Hunterlab Tristimulus Colorimeter Model D25P employing a collimated Illuminant C standard light source.

The present solid, thermoset polymers usually also have refractive indices at 20° C. and a wavelength of 589.3 nanometers of at least about 1.52. Often the refractive index undar the same conditions is at least about 1.53. Preferably it is at least about 1.55.

In many cases the solid, thermoset polymers of the present invention, on an undyed and untinted basis, also exhibit one or more other favorable properties. Among these favorable properties may be mentioned high luminous transmission, low haze, a density of about 1.3 grams per cubic centimeter or lower, relative ease in dyeability, and low shrinkage.

As used herein luminous transmission and haze value are determined on specimens having a thickness of about 2.5 millimeters in accordance with ASTM Test Method D 1003-61 (Reapproved 1977)using a Hunterlab Tristimulus Colorimeter Model D25P employing a collimated Illuminant C standard light source. As the luminous transmission approaches one hundred percent, the difference in luminous transmissions for two samples of the same material but of differing thicknesses approaches zero. Consequently, values of luminous transmission of about 90 percent or greater ascertained from samples having thicknesses as low as about 2 millimeters or as high as about 4 millimeters, approximate reasonably well the luminous transmission at the standard thickness. In similar fashion, haze values of about one percent or less ascertained on samples having thicknesses as low as about 2 millimeters or as high as about 4 millimeters approximate reasonably well the haze value at the standard thickness. Although the yellowness index seems to vary more with sample thickness than luminous transmission or haze value, nevertheless yellowness indices ascertained from samples having thicknesses as low as about 2 millimeters or as high as about 4 millimeters do provide a useful general indication of the yellowness index at the standard thickness.

In most cases the luminous transmission of the present solid, thermoset polymer on an undyed and untinted basis, is at least about 80 percent. Frequently the luminous transmission is at least about 85 percent. Preferably the luminous transmission is at least about 90 percent. When the polymerizate is dyed or tinted for use in sunglasses or filters, the luminous transmission of the dyed and/or tinted, sample is usually at least about 20 percent.

Often the haze value of the polymerizates, on an undyed and untinted basis is about 5 percent or lower. In many cases the haze value is about 4 percent or lower, and preferably it is about 2 percent or lower.

The density of most of the polymerizates of the invention is usually about 1.3 grams per cubic centimeter (g/cm$^3$) or lower. Frequently the density is about 1.27 g/cm$^3$ or lower, and preferably it is about 1.25 g/cm$^3$ or lower. As used herein, density is determined in accordance with ASTM Test Method C 729-75 and reported for a temperature of 25° C.

The dyeability test is conducted as follows: A dye solution is formed by dissolving 63.8 grams of RIT® black no. 15 dye (CPC International Inc.) in 1900 milliliters of distilled water and stirring the solution vigorously while boiling for approximately one-half hour. The dye solution is poured into a stainless steel container (length: 25.4 centimeters; width: 10.2 centimeters; depth: 12.7 centimeters) which was placed in a constant temperature bath. A sample holder of stainless steel wire with holders to engage binder clips used to hold samples of polymerizates is employed to immerse samples in the dye solution.

In dyeing, the dye bath is brought to a temperature of 91.7°–94.4° C. (197°–202° F.), if necessary the level of the dye solution is restored to its original level by the addition of distilled water, any accumulations are scraped off the sides and bottom of the container, and the solution is stirred vigorously. The test samples and control samples are cleaned with warm aqueous soap solution, rinsed with a 50/50 2-propanol/water solution and thoroughly dried. After the luminous transmissions of the samples are determined, the samples are rewetted and immersed in the dye bath for 5 minutes. The samples are then removed from the dye bath and immediately immersed in a warm aqueous soap solution, rinsed with distilled water or a 50/50 2-propanol/water solution, and thoroughly dried. The luminous transmissions of the samples are determined. The samples are again rewetted and immersed in the dye bath for a further 5 minutes. After the samples are withdrawn from the dye bath, they are immersed in warm aqueous soap solution, rinsed, and dried as before. The luminous transmissions of the samples are determined.

The control samples are samples cut from a single sheet of polymer cast from diethylene glycol bis(allyl carbonate) monomer. Other samples from this sheet had been previously dyed according to the above procedure and, based upon the luminous transmissions observed, reference luminous transmission values of 92%, 43% and 32% were assigned to the sheet after 0, 5, and 10 minutes dyeing time, respectively.

The observed transmissions of the test samples were corrected for variability from normal dyeing characteristics according to the following formula:

$$T = \frac{T_1 T_2 T_5}{T_3 T_4}$$

where:
T=Corrected luminous transmission of test samples after designated immersion period, percent;
$T_1$=Observed luminous transmission of test samples after designated immersion period, percent;
$T_2$=Reference luminous transmission for no immersion period, percent;
$T_3$=Observed luminous transmission of test sample before immersion, percent;
$T_4$=Observed luminous transmission of control sample after designated immersion period, percent;
$T_5$=Reference luminous transmission for designated immersion period, percent.

The corrections are made through conversion from luminous transmission to luminous absorbance and then back to luminous transmission. These corrections serve to minimize the effects of variations in factors such as dye bath concentration, composition, and temperature and to place the results on a baseline provided by the reference luminous transmissions.

Ordinarily the solid, thermoset polymerizates of the invention exhibit corrected luminous transmissions in the range of from about 5 to about 85 percent after being dyed for 10 minutes. In many cases the corrected luminous transmission is in the range of from about 10 to about 70 percent luminous transmission after being dyed for 10 minutes. Preferably the corrected luminous transmission is in the range of from about 15 to about 50 percent after being dyed for 10 minutes.

Shrinkage, expressed as percent, is one hundred times the difference between the denisty of the polymerization product and the density of the polymerization product. Expressed mathematically, Shrinkage=100(Dp-Dm)/Dp, where Dp is the density of the polymerization product and Dm is the density of the composition to be polymerized.

The invention is further described in conjunction with the following examples which are to be considered illustrative rather than limiting, and in which all parts are parts by weight and all percentages are percentages by weight unless otherwise specified.

In the Examples, compounds are abbreviated according to the following key:
BPM=4,4'-[1,3-phenylenebis(1-methylethylidene)]bis(phenol).
BPMBAC=The bis(allyl carbonate) of BPM.
BPMMAC=The mono(allyl carbonate) of BPM
BPP=4,4'-[1,4-phenylenebis(1-methylethylidene)]bis(phenol).
BPPBAC=the bis(allyl carbonate) of BPP.
BPIC=tertiary-butylperoxy isopropyl carbonate
IPP=diisopropyl peroxydicarbonate.

EXAMPLE I

A 2-liter, 5-neck, round bottom flask equipped with a stirrer, addition tube, argon purge tube, thermometer, and a water-cooled condenser and an ice bath was charged with 400 milliliters of methylene chloride, 63.20 grams of BPP, and 100 milliliters of acetone. The charged materials were stirred until most of the solids were dissolved. Next were added 62.04 grams of allyl chloroformate and 15 drops of an aqueous solution containing 12 percent by weight sodium borohydride and 40 percent by weight sodium hydroxide. The temperature of the reaction mixture was 3° C. Over a period of 75 minutes, 57.52 grams of 50 percent by weight aqueous sodium hydroxide solution was added while the temperature was maintained in the range of from 3° C. to 8° C. The reaction mixture was then stirred for one hour at 3° C. The reaction mixture was washed twice with 200 milliliters of water, three times with 100 milliliters of 5 percent by weight aqueous sodium hydroxide solution, and once with distilled water. After each washing step the mixture was phase separated and the aqueous phase was discarded. The organic phase resulting from the distilled water washing was dried over 55 grams of anhydrous sodium sulfate. After filtration, solvent was removed from the dried organic material under vacuum at 50° C. in a rotary evaporator. The resulting viscous, hazy liquid product was allowed to stand overnight. At room temperature the product was a white solid which melted in the range from 88° C. to 90° C. Infrared and nuclear magnetic resonance spectroscopy confirmed the product as being BPPBAC. Refractive index measurements of the product showed it to be a biaxial positive crystalline compound characterized by three critical refractive indices and having a 2 v angle of about 10° . The three critical refractive indices were 1.565, about 1.575, and 1.670, respectively.

EXAMPLE II

A 2-liter, 5-neck, round bottom flask equipped as in Example I was charged with 400 milliliters of methylene chloride, 69.2 grams of BPM, 62.04 grams of allyl chloroformate, 20 drops of an aqueous solution containing 12 percent by weight sodium borohydride and 40 percent by weight sodium hydroxide, and 100 milliliters of acetone. The temperature of the reaction mixture was 5° C. Over a period of 75 minutes, 57.52 grams of 50 percent by weight aqueous sodium hydroxide solution was added while the temperature was maintained in the range of from 5° C. to 8° C. The reaction mixture was stirred for one hour at about 3° C. The reaction mixture was washed once with 100 milliliters of deionized water, three times with 5 percent by weight aqueous sodium hydroxide solution, and once with deionized water. After each washing the mixture was phase separated and the aqueous phase was discarded. The organic phase resulting from the last deionized water washing was dried for 30 minutes over 55 grams of anhydrous sodium sulfate. Solids were removed from the dried organic phase by vacuum filtration and allowed to stand overnight. Solvent was then removed from the dried organic phase under vacuum in a rotary evaporator. The resulting product was a liquid at room temperature. Infrared and nuclear magnetic resonance spectroscopy confirmed the product as BPMBAC.

EXAMPLE III

A 2-liter, 5-neck, round bottom flask equipped as in Example I was charged with 350 milliliters of methylene chloride, 86.5 grams of BPM, 77.55 grams of allyl chloroformate, 20 drops of an aqueous solution containing 12 percent by weight sodium borohydride and 40 percent by weight sodium hydroxide, and 100 milliliters of acetone. The general procedure of Example I was then followed, except that 71.90 grams of 50 percent by weight aqueous sodium hydroxide was added and the last washing was with tap water rather than deionized water. High pressure liquid chromatography showed the product to contain 99.458 area percent BPMBAC, 0.506 area percent of oligomer and/or isomer, 0.020 area percent BPM, and 0.015 area percent BPMMAC.

EXAMPLE IV

A glass mold constructed of glass plates separated by a pliable gasket 2.84 millimeters thick and held together by means of large binder clips was heated to 108° C. in an oven. Five grams of the product of Example I was melted in an oven. BPIC was warmed to 50° C. in an oven. One-tenth gram of the warmed BPIC was admixed with the five grams of the melted product of Example I to form a casting solution. A portion of the casting solution was poured into the heated glass mold. After filling, the mold it was placed in a hot air oven and heated (1) at 105° C. for 4 hours and 15 minutes, (2) at 110° C. for one hour, and (3) at 105° C. overnight. The mold was then allowed to cool to room temperature and the resulting polymerizate was removed. The polymerizate was estimated to be about 2.4 millimeters thick. Various properties of the polymerizate are shown in Table 5.

TABLE 5

| Barcol Hardness | |
|---|---|
| 0-second | 37 |
| 15 seconds | 36 |
| Refractive Index, $n_D^{20}$ | 1.5748, 1.5748 |
| Abbe Number | 33.0 |
| Luminous Transmission, percent (~2.4 mm thickness) | 86.5 |
| Haze Value, percent (~2.4 mm thickness) | 23.0 |
| Yellowness Index (~2.4 mm thickness) | 19.0 |

EXAMPLE V

A first solution was prepared by dissolving 0.20 gram of phthalic anhydride in 20 grams of bisphenol A bis(allyl carbonate) monomer with warming.

A second solution was prepared by dissolving 2 grams of the product of Example I in 5 grams of styrene.

A casting solution was prepared by admixing 20.2 grams of the first solution, 1.75 grams of the second solution and 0.66 gram of IPP. A portion of the casting solution was charged into a glass mold constructed of two glass sheets separated by a pliable gasket that was about 2.84 millimeters thick. The glass mold was held together by large binder clips. After filling the mold it was placed in a hot air oven and exposed to the Standard Cure Cycle for Diisopropyl Peroxydicarbonate of Table 1. When the cure cycle was completed, the mold was removed from the oven and allowed to cool to room temperature. The resulting polymerizate was then removed from the mold and was found to be about 2.48 millimeters thick. Various properties of the polymerizate are shown in Table 6.

TABLE 6

| Barcol Hardness | |
|---|---|
| 0-second | 31 |
| 15 seconds | 27 |
| Refractive Index, $n_D^{20}$ | 1.5644, 1.5644 |
| Abbe Number | 35.1 |
| Luminous Transmission, percent (2.48 mm thickness) | 92.6 |
| Haze Value, percent (2.48 mm thickness) | 1.7 |
| Yellowness Index | 1.6 |

EXAMPLE VI

A casting solution was formed by admixing 40 grams of the product of Example II and 1.3 grams of IPP. The density of the casting solution at 25° C. was 1.1237 grams per cubic centimeter. A sheet of polymerize was prepared from the casting solution according to the procedure of Example V. The polymerizate was found to be about 2.30 millimeters thick. Various properties of the polymerizate are shown in Table 7.

TABLE 7

| Barcol Hardness | |
|---|---|
| 0-second | 45 |
| 15 seconds | 43 |
| Luminous Transmission, percent | 90.7 |
| (2.30 mm thickness) | |
| Haze Value, percent | 1.0 |
| (2.30 mm thickness) | |
| Yellowness Index | 1.2 |
| (2.30 mm thickness) | |
| Density at 25° C., grams/cm$^3$ | 1.179 |
| Shrinkage, percent | 4.7 |

EXAMPLE VII

A casting solution was formed by admixing 41.35 grams of the product of Example II and 1.28 grams of IPP. The casting solution was degassed in a vacuum oven. A portion of the degassed casting solution was charged into a glass mold constructed of two glass sheets separated by a pliable gasket that was about 2.84 millimeters thick. The glass mold was held together by large binder clips. After filling the mold it was placed in a hot air oven and the Standard Cure Cycle for Diisopropyl Peroxydicarbonate of Table 1 was begun. After the cure cycle had proceeded 2 hours, the oven was shut off and remained shut off overnight. The next morning the oven was turned on and the cam governing the oven thermostat was advanced to a position indicating 8 cumulative hours into the cycle. Nine hours later the cure cycle so modified ended at a temperature of 105° C. The mold was removed from the oven and allowed to cool to room temperature. The resulting polymerizate was then removed from the mold and was found to be about 2.45 millimeters thick. Various properties of the polymerizate are shown in Table 8.

TABLE 8

| Barcol Hardness | |
|---|---|
| 0-second | 44 |
| 15 seconds | 43 |
| Luminous Transmission, percent | 92.5 |
| (2.45 mm thickness) | |
| Haze Value, percent | 0.9 |
| (2.45 mm thickness) | |
| Yellowness Index | 1.5 |
| (2.45 mm thickness) | |
| Luminous Transmission, percent | |
| (2.45 mm thickness) | |
| After Dying | |
| 5 min. in bath | 49, 48 |
| 10 min. in bath | 33, 34 |

EXAMPLE VIII

A casting solution was formed by admixing 16.33 grams of the product of Example III and 0.5 gram of IPP. A sheet of polymerizate was prepared from the casting solution according to the procedure of Example V. The polymerizate was found to be about 2.55 millimeters thick. Various properties of the polymerizate are shown in Table 9.

TABLE 9

| Barcol Hardness | |
|---|---|
| 0-second | 43 |
| 15 seconds | 42 |
| Luminous Transmission, percent | 92.4 |
| (2.55 mm thickness) | |
| Haze Value, percent | 1.2 |
| (2.55 mm thickness) | |
| Yellowness Index | 1.7 |
| (2.55 mm thickness) | |

EXAMPLE IX

A first solution was formed by dissolving 0.4 gram of pentabromophenyl methacrylate in 4.0 grams of styrene with warming. A casting solution was formed by admixing 35.2 grams of the product of Example III, 0.4 grams of phthalic anhydride, 4.4 grams of the first solution, and 1.2 grams IPP. A sheet of polymerizate was prepared from the casting solution according to the procedure of Example V. The polymerizate was found to be about 2.20 millimeters thick. Various properties of the polymerizate are shown in Table 10.

TABLE 10

| Barcol Hardness | |
|---|---|
| 0-second | 41 |
| 15 seconds | 40 |
| Refractive Index, $n_D^{20}$ | 1.5692, 1.5741, 1.5688 |
| Abbe Number | 32.9 |
| Luminous Transmission, percent | 91.8 |
| (2.20 mm thickness) | |
| Haze Value, percent | 1.1 |
| (2.20 mm thickness) | |
| Yellowness Index | 0.9 |
| (2.20 mm thickness) | |
| Luminous Transmission, percent | |
| (2.20 mm thickness) | |
| After Dying | |
| 5 min. in bath | 18 |
| 10 min. in bath | 10 |

Although the present invention has been described with reference to specific details of certain embodiments thereof, it is not intended that such details should be regarded as limitations upon the scope of the invention except insofar as they are included in the accompanying claims.

I claim:

1. A compound represented by the formula

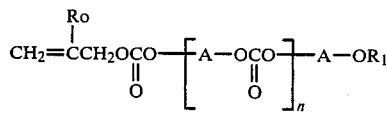

wherein
(a) $R_1$ is

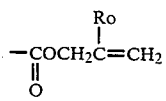

or hydrogen;

(b) each Ro of the compound is independently hydrogen, halo, or alkyl;
(c) each A of the compound is independently represented by the formula

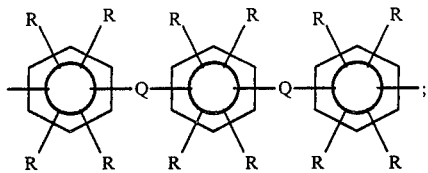

(d) each R of the compound is independently hydrogen, halo, or a monovalent organo group containing from 1 to about 12 carbon atoms;
(e) each Q of the compound is independently oxy, sulfonyl, thio, alkanediyl, or alkylidene; and
(f) the value of n is an integer in the range of from 0 to about 4.

2. The compound of claim 1 wherein $R_1$ is

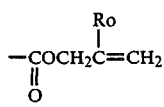

and the value of n is zero.

3. The compound of claim 2 wherein:
(a) each Ro of the compound is independently hydrogen, halo, or alkyl containing from 1 to about 4 carbon atoms;
(b) said alkanediyl contains from 2 to about 4 carbon atoms and said alkylidene contains from 1 to about 5 carbon atoms; and
(c) said monovalent organo group is alkyl containing from 1 to about 4 carbon atoms, phenyl, chloro, or bromo.

4. The compound of claim 3 wherein each Ro is hydrogen.

5. The compound of claim 3 wherein each Q is alkylidene containing from 1 to about 5 carbon atoms.

6. The compound of claim 3 wherein each Q is 1-methylethylidene.

7. The compound of claim 2 wherein A is represented by the formula

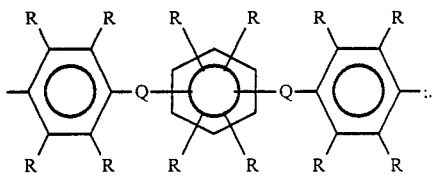

8. The compound of claim 2 wherein A is represented by the formula

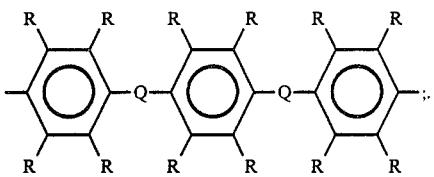

9. The compound of claim 8 wherein each R is hydrogen and each Ro is hydrogen.

10. The compound of claim 9 wherein each Q is alkylidene.

11. The compound of claim 9 wherein each Q is 1-methylethylidene.

12. The compound of claim 2 wherein A is represented by the formula

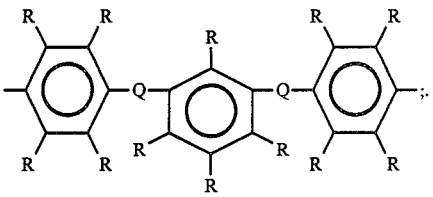

13. The compound of claim 12 wherein each R is hydrogen and each Ro is hydrogen.

14. The compound of claim 13 wherein each Q is alkylidene.

15. The compound of claim 13 wherein each Q is 1-methylethylidene.

16. A mixture of polymerizable compounds, and mixture comprising at least one compound of claim 1.

17. A mixture of polymerizable compounds, said mixture comprising at least one compound of claim 9.

18. A mixture of polymerizable compounds, said mixture comprising at least one compound of claim 13.